US012003909B2

(12) United States Patent
O'Callaghan

(10) Patent No.: US 12,003,909 B2
(45) Date of Patent: Jun. 4, 2024

(54) MODULAR EARPHONE

(71) Applicant: DROWN LIMITED, Edinburgh (GB)

(72) Inventor: Mark O'Callaghan, Dunfermline (GB)

(73) Assignee: DROWN LIMITED, Edinburgh (GB)

( * ) Notice: Subject to any disclaimer, the term of this patent is extended or adjusted under 35 U.S.C. 154(b) by 186 days.

(21) Appl. No.: 17/632,187

(22) PCT Filed: Jul. 30, 2020

(86) PCT No.: PCT/EP2020/071532
§ 371 (c)(1),
(2) Date: Feb. 1, 2022

(87) PCT Pub. No.: WO2021/019026
PCT Pub. Date: Feb. 4, 2021

(65) Prior Publication Data

US 2022/0232308 A1 Jul. 21, 2022

(30) Foreign Application Priority Data

Aug. 1, 2019 (GB) ..................................... 1910999

(51) Int. Cl.
*H04R 1/10* (2006.01)
*H04R 1/30* (2006.01)
*H04R 25/00* (2006.01)

(52) U.S. Cl.
CPC ......... *H04R 1/1016* (2013.01); *H04R 1/1058* (2013.01); *H04R 1/1066* (2013.01);
(Continued)

(58) Field of Classification Search
CPC .. H04R 1/1016; H04R 1/1058; H04R 1/1066; H04R 1/30; H04R 5/0335; H04R 25/652; H04R 2201/10; H04R 2460/11
See application file for complete search history.

(56) References Cited

U.S. PATENT DOCUMENTS 5,975,235 A * 11/1999 Schlaegel .............. H04R 25/48 181/129
2003/0059071 A1* 3/2003 Dunham .............. H04R 1/1016 381/74

(Continued)

FOREIGN PATENT DOCUMENTS

EP 1874080 A2 1/2008
WO 2016118401 A1 7/2016
WO 2018051050 A1 3/2018

*Primary Examiner* — Huyen D Le

(74) *Attorney, Agent, or Firm* — FRESH IP PLC; Clifford D. Hyra; Aubrey Y. Chen

(57) ABSTRACT

Disclosed herein is a modular earphone segment and method of manufacturing, the modular earphone segment housing an acoustic waveguide therein, the acoustic waveguide including between an inner end and an outer end a series of acoustic horns intercalated between a series of transition regions and the modular earphone segment including an acoustic seal module, a body module and an acoustic transmission module, the acoustic seal module being configured to be connected to the body module by releasably coupling means and the body module being configured to be connected to the acoustic transmission module by connecting means such that, when connected, the acoustic seal module, the body module and the acoustic transmission module are acoustically coupled.

29 Claims, 9 Drawing Sheets

(52) U.S. Cl.
CPC ............. *H04R 1/30* (2013.01); *H04R 25/652* (2013.01); *H04R 2201/10* (2013.01); *H04R 2460/11* (2013.01)

(56) References Cited

U.S. PATENT DOCUMENTS

| | | | | |
|---|---|---|---|---|
| 2008/0002835 | A1* | 1/2008 | Sapiejewski ........... | H04B 1/202 381/71.6 |
| 2016/0261944 | A1 | 9/2016 | Silvestri | |
| 2018/0124509 | A1 | 5/2018 | Colich | |

* cited by examiner

MODULAR EARPHONE

FIELD OF THE DISCLOSURE

This disclosure relates generally to the field of modular earphones and methods, in particular, to modular earphone segments and methods used for improving the given output of any acoustic transducer, such as a driver or a speaker, and for directivity control of acoustic waves and acoustic vibrations generated by the acoustic transducer. More particularly, the disclosure relates to modular earphone segments used to contain and sculpt the shape of the acoustic waves and acoustic vibrations and to methods of manufacturing such modular earphone segments.

BACKGROUND

Audio headphones have long been used in various listening applications, such as mobile music, telephony, video gaming, where the noise elimination and the quality of the audio experience was crucial. Audio headphones include for each ear an earpiece that houses the speaker driver. The earpiece can be over the ear pinna with an enclosure that covers the entire pinna of the outer ear and minimizes or prevents outside noise from entering the ear. The earpiece can also be an on-ear type, which sits on the ear pinna, without the enclosure or in-ear earbuds.

Earphones or earbuds are very small headphones that are fitted directly in the outer ear, facing but not inserted in the ear canal. Earphones are portable and convenient, but many people consider them uncomfortable. They provide limited acoustic isolation and leave room for ambient noise to seep in.

In-ear headphones, also known as in-ear monitors (IEMs) or canal phones, are small headphones with similar portability to earphones, but they are inserted in and fill the outer ear. Most in-ear monitors are formed from an elastomeric material. The outer shells (or back cases) of in-ear headphones may be made up of a variety of materials, such as plastic, aluminium, ceramic and other metal alloys. Because in-ear monitors fit within the outer ear, they typically use a very small style of driver called a 'balanced armature'. Balanced armature drivers reproduce sound fairly accurately but are expensive and underpowered when compared with dynamic drivers.

Custom-fit ear canal plugs are made from silicone rubber, elastomer or foam. Custom in-ear headphones use castings of the ear to create custom-moulded plugs that provide added comfort and noise isolation. Unwanted sound from the environment can be reduced by excluding sound from the ear by passive noise isolation or, often in conjunction with isolation, by active noise cancellation.

Passive noise isolation is essentially using the body of the earphone, either over or in the ear, as a passive earplug that simply blocks out sound. The headphone types that provide most attenuation are in-ear canal headphones since they block anywhere from 10 to 15 dB. Active noise-cancelling headphones use a microphone, amplifier and speaker to pick up, amplify, and play ambient noise in phase-reversed form; this to some extent cancels out unwanted noise from the environment without affecting the desired sound source, which is not picked up and reversed by the microphone. They require a power source, usually a battery, to drive their circuitry.

In-ear-monitors do not typically enter the ear canal. They fill the outer ear, but do not extend into the ear canal. The exit for the sound is right by the entrance to the ear canal or sometimes just within the entry to the ear canal.

The main problem to address is to design an earphone which is comfortable to wear, either in the outer ear or near the ear canal, and which provides adequate acoustic isolation from ambient noise. The present disclosure discloses a modular earphone which helps contain and sculpt the shape of acoustic waves (i.e., audio waves) and acoustic vibrations generated by the acoustic transducer of the earphone so that the acoustic waves are efficiently and deliberately shaped and then delivered directly and directed to the user's ear canal, and the acoustic vibrations are delivered to various other parts of the user's ear through the bone, cartilage and/or concha of the user's ear.

A modular design can be characterised by functional partitioning into discrete scalable, reusable modules with the rigorous use of well-defined modular interfaces. Modularity offers benefits such as reduction in cost (due to less customisation), interoperability, shorter learning time, flexibility in design, non-generationally constrained augmentation or updating (adding new solution by merely plugging in a new module), and exclusion. Modularity in inter-operable systems, such as modular earphones, offers additional benefits in reduced product development cost and time to market.

Modular earphones can be customised by the user by adding and/or replacing with similar, different sized or alternative modular components. The customisation can be done without altering the functionality of the earphone. However, the number and type of customisation modules currently available for modular earphones is restricted to the user being able to replace the ear tip (or acoustic seal module) to fit different sized inner ears. However, the shape and size of the ear tip dictates the shape of the acoustic waves entering the user's ear canal from the acoustic waveguide (or acoustic canal) of the modular earphone, therefore it affects the audio quality of the modular earphone.

The main problem to address it to design a modular earphone whose replaceable ear tip (or acoustic seal module) does not disturb or, even better, improves the shape of the acoustic waves entering the user's inner ear and/or ear canal. The present disclosure discloses a modular earphone whose acoustic seal module houses part of the earphone's acoustic waveguide to ensure a continuity in the transmission and coupling of the acoustic waves to the user's inner ear and/or ear canal.

Another limitation with current modular earphones is that, when products come from the factory with completely fixed constructions in the design of the various modules, there is little or no opportunity for the user to upgrade or select modular components of different quality grade or price points. Many consumers may desire to select modular components which are best suited for the multiple applications in which the modular earphone might be used, thus allowing consumers to upgrade the modular earphone after the initial purchase. For example, the user may listen to audio while jogging or whilst playing a computer game. With fixed construction of the modular components, then the user is faced with the prospect of buying several sets of modular headphones, each best suited for a desired use.

The main problem to address is to design a modular earphone whose modular components allow the user to customise it depending on the intended use. The present disclosure discloses a modular earphone with inter-operable and inter-changeable modular components. For example, the acoustic transducer seating can be customised so that the acoustic transducer may be located fully or partially within the acoustic transducer seating. Furthermore, the body module and the acoustic transmission module (housing the acoustic transducer seating) can be customised for different applications by employing different manufacturing methods (3D printing, moulding, co-moulding or over-moulding) of coupling the two modules together for improved transmission of acoustic vibrations.

There is a need for improvements in modular earphones allowing users to customize the modular earphones to fit different ear sizes and to be used for several different applications (jogging, playing games, on planes, etc.).

SUMMARY

Therefore, it is an object of embodiments of the present invention to provide a modular earphone whose acoustic seal module is easily replaceable and customizable so as to fit different ear sizes, whilst still maintaining audio wave integrity upon transmission. Being available in different sizes, the acoustic seal module gives the user the required fit to ensure that there is maximum comfort and correct alignment between the earphone's audio exit hole and the user's ear canal and/or inner ear.

It is a further object of embodiments of this invention to provide a modular earphone whose acoustic waveguide (or acoustic canal) helps contain and sculpt the shape of the acoustic waves transmitted by the acoustic transducer (i.e., the driver).

It is yet a further object of embodiments of this invention to provide a modular earphone whose acoustic seal module and body module are manufactured and customizable to provide the highest external noise isolation and the greatest acoustic vibration transfer to the concha and anti-helix of the user's ear.

The invention is defined by the claims.

In accordance with a first aspect of the invention, there is provided a modular earphone segment housing an acoustic waveguide therein, the acoustic waveguide having an inner end and an outer end, at least the inner end being open, the modular earphone segment comprising: an acoustic seal module housing therein a first section and the inner end of the acoustic waveguide, a body module housing therein a second section and the outer end of the acoustic waveguide, and an acoustic transmission module, wherein the acoustic seal module is configured to be connected to the body module by releasably coupling means and the body module is configured to be connected to the acoustic transmission module by connecting means such that, when connected, the first section of the acoustic waveguide is substantially continuous with the second section of the acoustic waveguide and the acoustic seal module, the body module and the acoustic transmission module are acoustically coupled and wherein the acoustic waveguide comprises between the inner end and the outer end a series of acoustic horns intercalated between a series of transition regions such that a first acoustic horn of the series of acoustic horns is housed near the inner end of the acoustic waveguide and a last acoustic horn of the series of acoustic horns is housed near the outer end of the acoustic waveguide.

A "modular earphone segment" is defined as a section of a modular earphone. The segment itself is modular and is formed of inter-operable and interchangeable modules, each of which being customizable and replaceable by the user.

The skilled person would understand "acoustic transmission module" to mean the section of the modular earphone segment that ensures the most optimum transmission of acoustic waves and acoustic vibrations from an acoustic transducer to the user's ear.

The acoustic transmission module may comprise an acoustic transducer seating for partially or completely housing an acoustic transducer and acoustic transmission means.

The acoustic transducer seating may be made of hard plastic. Alternatively, the acoustic transducer seating may be made from a material (typically rubber) with a hardness higher than the hardness of the acoustic transmission means (which may also preferably be made of rubber). The hardness is a measure of the resistance to localized plastic deformation induced by either mechanical indentation or abrasion. Macroscopic hardness is generally characterized by strong intermolecular bonds and is dependent on ductility, elastic stiffness, plasticity, strain, strength, toughness, viscoelasticity and viscosity.

The acoustic transducer seating may be configured to partially or completely house an acoustic transducer. Such a configuration secures the acoustic transducer to ensure there is maximum vibrational transfer through to the softer (preferably rubber) medium of the acoustic transmission means.

The acoustic transducer may be an acoustic driver, such as a speaker. The driver of embodiments of the present invention may comprise custom 14.8 mm drivers which contribute towards top quality audio, with swappable driver modules allowing for a fully customized listening immersive experience.

The driver for the modular earphone may comprise any one of four main types of drivers:

a) Dynamic Driver—lots of bass, lots of movement and lots of vibration; this is the most typical low-cost driver used in the majority of earphones;
b) Planar Magnetic Driver—more expensive, less movement and often heavier and larger;
c) Balanced Armature—these are smaller drivers and often used in in-ear-monitors; they don't vibrate nearly as much and currently cannot produce the vibration effect required by the modular earphone of embodiments of the present invention;
d) Electrostatic Driver—these are typically larger flat drivers that can accurately reproduce sound but are typically also very expensive.

The driver for the modular earphone of embodiments of the present invention preferably comprises a dynamic driver since this driver is capable of creating a lot of audio 'feeling' in the user's ear. It is to be noted that the driver seating boosts a specific driver locating design in order to improve audio quality (that is the audio transmission is improved through the physical nature of the driver locating design of the driver seating prior to any electronic enhancement). Most drivers are seated within the driver seating with a glue which insulates the driver from the driver seating and allows flexing between the driver and its seating. The driver seating of embodiments of the present invention employs a glue which promotes the transmission of acoustic vibrations. Preferably, the glue is a 3M® glue with micro glass beads incorporated within the glue.

The driver preferably sits completely within the acoustic transducer seating to ensure the best possible acoustic vibration transmission. The driver must be able to transmit vibrational information to the nerve endings and bone conduction paths to the brain. And this is most easily done when the driver is situated within the acoustic transducer seating, and hence close inside the user's ear.

After testing the vibrational characteristics of drivers sold by various vendors, the present inventors have surprisingly discovered that, although two drivers may sound similar and have similar frequency responses, they may have very different vibration characteristics. The skilled person would find this discovery unexpected since no other modular earphone manufacturers are specifying vibration characteristics when they describe their drivers.

The acoustic transmission means may comprise means for coupling acoustic waves and/or means for coupling acoustic vibrations from the acoustic transducer into the user's ear or to the user's brain.

The modular earphone of embodiments of the present invention allows four pathways to transmit audio information (such as acoustic waves and acoustic vibrations) to the user's ear and/or brain, as follows:

1. moving air along the acoustic waveguide housed within the modular earphone segment and then channeling it into the ear canal
2. transmitting the acoustic vibration of the driver to the nerve endings in the outer ear, especially around the anti-helix and the concha
3. transmitting the acoustic vibration through the concha to the cartilage and through to the inner ear
4. transmitting the acoustic vibrations to the bone and then through to the inner ear.

The means for coupling acoustic waves from the acoustic transducer into the ear may comprise coupling by means of the acoustic waveguide.

The skilled person would understand "acoustic waveguide" to mean the acoustic canal housed within the modular earphone segment, hence within the modular earphone, and used to transmit acoustic waves from an acoustic transducer. The internal shape of the acoustic waveguide is designed to improve the coupling of the acoustic waves (or sound or audio waves) from the acoustic transducer into the ear of the wearer. This improved coupling may result in less attenuation of the sound (perceived as enhanced volume), better fidelity of audio reproduction (perceived as a sense of being an immersive audio experience similar to a live audio experience), or both.

The means for coupling acoustic vibrations may comprise forming the acoustic transmission module of a combination of materials having different hardness at different sections of the acoustic transmission module. The combination of materials is designed to deliver acoustic vibrations in the same manner air transmits vibrations, which is interpreted as height, depth and distance (spherical 3D audio). The human ear contains the following nerves: greater auricular nerve, lesser occipital nerve, auriculotemporal nerve and branches of the facial and vagus nerves. One or all of these nerves deliver electrical impulses to the brain.

This in turn helps humans interpret acoustic vibrations that constantly surround them as audio which provides the human's sense of where things are in the world.

The means for coupling acoustic vibrations may comprise any one of or a combination of any one of protruding projections, prongs, lobes and cages.

The considerations for the materials used for making the acoustic transmission module would have to take into account maximizing the acoustic vibration transmission by means of (i) using hard material inserts (such as protruding projections, prongs, lobes, rods and cages) to provide low loss vibration paths to the important contact points to the user's ear.

An embodiment may consist of a cage connected directly to the driver to transmit the acoustic vibrations more efficiently.

The hard materials may comprise metal (such as AI), diamond or hard plastic.

(ii) using rigid materials to transmit vibration covered in a thin layer of soft materials at skin contact points, i.e., allows the use of best materials for vibration transmission and then the use of appropriate bio-materials for interface with skin to minimise vibration loss.

(iii) Increasing the wall thicknesses to help transmit vibrations to the correct areas of the user's ear.

(iv) using glues and/or pastes to better connect the driver to the driver seating and to transmit vibrations.

The means for coupling acoustic vibrations from the acoustic transducer into the ear may comprise transmitting the coupled acoustic vibrations into the anti-helix and/or the concha of the ear and/or the entry into the ear canal.

The transmitting of the coupled acoustic vibrations may comprise transmission through the bone, cartilage and nerves of the ear. Preferably, the transmitting occurs to the nerve endings and/or by means of bone conduction to the brain. This creates an impression of being 'closer' to the music or immersed in the sound.

The skilled person would understand "connecting means" to mean any means for joining separate modules to one another and "releasably coupling means" to mean any means which allow separate modules to be connected in such a way that they can be released (or de-coupled) from one another, whilst still preserving their integrity as separate modules (i.e., the releasably coupling means did not deform the modules upon disconnection).

Preferably, the acoustic seal module may be configured to be connected to the body module by releasably coupling means and the body module may be configured to be connected to the acoustic transmission module by connecting means such that, when connected, the acoustic seal module, the body module and the acoustic transmission module are acoustically coupled (i.e., there is a seamless transmission of the acoustic waves and acoustic vibrations from the driver to the user's ear and brain). The connecting means connecting the body module to the acoustic transmission module may be configured to be attached, 3D printed, moulded, co-moulded or over-moulded to the acoustic transmission module.

Preferably, the acoustic transmission module may be configured to be attached, moulded, 3D printed, co-moulded or over-moulded to the body module by means of the attached, 3D printed, moulded, co-moulded or over-moulded connecting means.

The advantage of the above-mentioned manufacturing methods is that they eliminate the existence of sharp joints between the acoustic transmission module and the body module, the joints typically being responsible for/inducing loses in transmission of acoustic vibrations.

Preferably, the attaching of the acoustic transmission module to the body module may be by gluing, sonic welding, screwing or by means of a mechanical snap-to-rigid-cap. More preferably, the acoustic transmission module and the body module may be designed to be moulded as a single assembly, i.e., two different materials moulded together either by over-moulding or as two-shot process.

Preferably, the connecting means may comprise the means for coupling acoustic vibrations. This design has the advantage of much simpler and more cost-effective manufacturing.

The skilled person would understand "acoustic horn" to mean a tapered sound guide designed to provide an acoustic impedance match between an acoustic source (i.e., a sound source, such as a driver) and free air. This has the effect of maximizing the efficiency with which acoustic waves (i.e., sound waves) from the particular source are transferred to the air. Conversely, a horn can be used at the receiving end to optimize the transfer of sound from the air to a receiver. Bjorn Kolbrek discusses various geometries for acoustic horns in the paper titled 'Horn Theory: An Introduction, Part 1 and Part 2' published in audioXpress 2008.

Typically, acoustic horns flare out from the driver, as shown in FIG. 8, diagram (a). FIG. 8 also shows the cross-sections of two types of horns: a radial horn in a vertical (b1) and horizontal (b2) cross-section and an oblate spheroidal horn cross-section (c).

Acoustic waveguide design considerations are mainly focused on improving (by increasing) the given output of any type of driver. And increasing the output may be undertaken in two different ways:

1. Loading of the Driver
   - most of the energy put into a direct radiating driver (such as a loudspeaker) will not reach the air but will be converted to heat in the voice coil and mechanical resistances in the driver unit.
   - increasing the loading of the driver over that of free air increases efficiency and hence the output
2. Directivity Control
   - a driver typically radiates sound in an uncontrolled fashion in an approximate hemisphere
   - concentrating the sound into a certain solid angle increases the output further. The walls of the acoustic waveguide restrict the spreading of the sound waves, so that sound can be focused into the areas where it is needed.

Therefore, the design of the acoustic waveguide may consist in providing a mechanical way to increase the output of a driver and in enabling a tuning of the acoustic waveguide to produce better audio signals with less distortion.

The acoustic waveguide of the modular earphone segment may comprise between the inner end and the outer end a series of acoustic horns intercalated between a series of transition regions. This waveguide configuration helps contain and sculpt the shape of the audio waves transmitted by the driver.

Preferably, a first acoustic horn of the series of acoustic horns is housed near the inner end of the acoustic waveguide and a last acoustic horn of the series of acoustic horns is housed near the outer end of the acoustic waveguide. Having a first acoustic horn near the inner end of the acoustic waveguide ensures good directionality of the audio signal into the ear canal. Furthermore, having a last acoustic horn near the outer end of the acoustic waveguide (i.e., close to the driver) ensures good coupling of the audio signal transmitted by the driver into the acoustic waveguide.

The above-mentioned acoustic waveguide design considerations allow improving the given output of any type of driver. At least one embodiment of the present invention does this primarily by disclosing a horn contracting/tapering into the waveguide from the driver, only to expand again towards the inner end of the waveguide to carry the audio signal into the user's ear.

Preferably, the first acoustic horn may be configured to flare out towards the inner end of the acoustic waveguide to sculpt and couple acoustic waves into the ear canal ear. Alternatively, and/or additionally, the last acoustic horn may be configured to flare out towards the outer end of the acoustic waveguide to couple acoustic waves from the acoustic transmission module into the acoustic waveguide.

The shape (i.e., the cross-section) of the exit horn (i.e., the acoustic horn located near the inner end of the acoustic waveguide) may be varied depending on the type of sound/acoustic wave dispersal that is desired for a particular use (such as whilst jogging or playing computer games). The shape of the exit horn has a direct impact on the user experience as it sculpts the audio signal as it exits the waveguide of the modular earphone.

Preferably some or all of the acoustic horns of the series of acoustic horns have any one of or a combination of any one of conical, spherical wave, spheroidal waveguide, radial, hyperbolic, parabolic, reversed flare, oblate, oblate spheroidal waveguide, exponential, exponential quadratic, pipe, parabolic, multicellular, reversed flare, Le Cleac'h, Manta-Ray, Western Electric, Wilson modified exponential and Iwata horn shapes.

In a preferred embodiment, the first and the last acoustic horns may both have conical or parabolic horn shapes.

Some or all of the transition regions of the series of intercalated transition regions may be configured to have transition shapes acoustically matched to the shapes of the adjoining horns. Preferably, the shapes of the transition regions may also have conical, spherical wave, spheroidal waveguide, radial, hyperbolic, parabolic, reversed flare, oblate, oblate spheroidal waveguide, exponential, exponential quadratic, pipe, parabolic, multicellular, reversed flare, Le Cleac'h, Manta-Ray, Western Electric, Wilson modified exponential and Iwata horn shapes.

The acoustic waveguide may include a series of bends between the inner end and the outer end. Preferably, the series of intercalated transition regions is located at the series of bends.

The skilled person would understand "acoustic seal module" to mean a noise isolating module that fits different ear shapes. The ear shapes to be 'filled' by the acoustic seal module may be the outer ear and/or the inner ear and/or the ear space near the ear canal. The tip of the acoustic seal module (i.e., the end part or the inner end of the acoustic seal module which fits the ear space near the ear canal and/or the ear canal itself) forms a seal (i.e., a stopper) giving more noise isolation.

Standard tips, typically made of foam, are inserted directly into the ear and/or ear canal and expand to fill the ear space. After time, contact between the expanding foam tip and the thin skin on the inside of the ear canal causes discomfort, irritation and potentially earache. The, typically small, tip of the acoustic seal module (i.e., the user-sized part) of embodiments of the present invention registers with the opening of the user's ear canal, but the shoulder of the tip prevents it from jamming into the ear canal. This design helps with the comfort of the modular earphones as there isn't a tip jammed into the ear canal. The tip is rather positioned inside and adjacent to the ear canal. This design consideration is very important as the inside of the ear canal is sensitive and can hurt if an object is stuffed or jammed into it.

Another consideration is the shape of the section of the acoustic waveguide housed within the acoustic seal module and its tip. For standard foam tips, once inserted directly and expanded into the ear canal, this means that the acoustic waveguide (i.e, the pathway for acoustic waves) must either be very small to allow for sufficient foam to create a good seal or the foam must be very thin to allow for more acoustic waves through the acoustic waveguide, which in turn means that the acoustic seal module and its tip are not effective in providing noise isolation and transmission of acoustic waves. By contrast, the tip of the acoustic seal module of embodiments of the present invention does not fully enter the ear canal and it rather rests on the crest of the ear canal, meaning that the tip creates a better surface area for contact on the outside of the ear canal. This tip arrangement also provides more design freedom for the shape of the acoustic waveguide near the tip.

A further consideration in the design of the present acoustic seal modules and their tips is the understanding and consideration of differences in sizes of users' ears versus the size of users' ear canals. Hence, a user could have a small ear, but a large diameter ear canal. The main advantage of the present acoustic seal modules is that they match the overall size of the ear and then also match the acoustic seal modules' tip size to the ear space near the user's ear canal size.

Furthermore, the acoustic seal modules being available in different sizes, this gives the user the required fit to ensure that there is maximum comfort, correct alignment between the earphone's exit hole and user's ear canal, full acoustic seal to provide isolation and greatest vibration transfer to the concha and anti-helix.

The acoustic seal module and/or its tip may be formed from an elastomeric material, such as a memory foam, a natural occurring rubber, a thermoset plastic (i.e., a plastic which is made by forming and then hardening with a chemical reaction, rather than by simply melting and re-solidifying) (like silicone) material or a thermoplastic elastomer (TPE). An 'elastomer' is any material, such as natural or synthetic rubber, that is able to resume its original shape when a deforming force is removed.

There are two aspects to the size of the acoustic seal module and its tip —one is the overall size of the (outer) ear and the second is the size of the ear canal. By contrast, the sizing of the acoustic seal modules of other modular earphones is only based on the overall size of the (outer) ear, and not on the size of the ear canal.

The acoustic seal module may be user replaceable. Preferably, it may be custom fit or it may come in a range of comfortable sizes (such as small, medium and large).

The acoustic seal module may be sized for the overall geometry of the outer ear, but then the tip of the acoustic seal module fits the ear space near the ear canal and maximizes sound exit through the exit acoustic horn of the acoustic waveguide. This is advantageous at it provides full acoustic seal by isolation of the external noise due to insertion and filling of the outer ear and the blocking of the entrance into the ear canal. The tip of the acoustic seal module close to the ear canal may be made of a soft rubber, a foam, a memory foam or silicone and it too may come in different sizes.

The skilled person would understand "body module" to mean the central section of the modular earphone segment. The body module provides integrity (acting as a backbone) to the modular earphone and is configured to positively engage, at one end, with the acoustic seal module and, at the other opposite end, with the acoustic transmission module.

The releasably coupling means connecting the body module to the acoustic seal module may comprise cooperating coupling means, such as cooperating pairs of male keying features and female keying features. These keying features have the advantage of allowing the two modules to align with respect to each other such that they are acoustically coupled.

The cooperating coupling means may also comprise pivoting around a centrally-located ledge or a sliding—and—locking mechanism.

Preferably, due to the softer material of the ear tip, a female keying feature provided on the acoustic seal module bends around a male keying feature provided on the body module and attaches (securely and releasably) onto a ledge, also provided on the body module. In this manner, the connection of the acoustic seal module to the body module boosts the required grip allowing it to stay secured inside the user's ear.

The 'flexibility' of the acoustic seal module and the body module is both a function of material properties and geometry. For example, the section of the acoustic seal module engaging with the body module at the keying features may be made of a thicker part of a material versus a thinner part of the same material at the ear tip of the acoustic seal module. Preferably, the material of the ear tip is soft, therefore flexible enough, for the ear tip to be easily unseated and flexed around the male keying feature and the ledge (without deforming the ear tip) provided on the body module. This is advantageous as the ledge gives the ear tip a locating point, thus preventing it from rotating and potentially slipping off.

Shore durometer is a device for measuring the hardness of a material, typically a polymer, elastomer or rubber material. Higher numbers on the scale indicate a greater resistance to indentation and thus harder materials. Lower numbers indicate less resistance and softer materials.

The term is also used to describe a material's rating on the scale, as in an object having a "'Shore durometer' of 90."

Preferably, the body module may be made of a material having Shore A 40 hardness. The ear tip of the acoustic seal module may have a lower hardness so to flex around the male keying feature provided on the body module. More preferably and/or alternatively, areas of the ear tip may be layered with extra soft materials, such as Shore A 0-10. These layers may be added as an over-moulded step during the manufacturing process.

The acoustic seal module may house therein a first section and the inner end of the acoustic waveguide and the body module may house therein a second section and the outer end of the acoustic waveguide such that, when the acoustic seal module is connected with the body module, the first section of the acoustic waveguide is substantially continuous with the second section of the acoustic waveguide.

The percentage of the first section of the acoustic waveguide housed within the acoustic seal module may vary from 10% to 90% of the acoustic waveguide. The percentage of the second section of the acoustic waveguide housed within the body module may vary from 10% to 90%. Any combination of percentage splits of the first section and the second section may be contemplated, as long as the split does not affect the integrity of the releasably coupling means and the acoustic functioning of the acoustic waveguide. Preferably, the first section may be 70% of the acoustic waveguide and the second section 30% of the acoustic waveguide. More preferably, the first section may be 50% of the acoustic waveguide and the second section 50% of the acoustic waveguide.

Either one or both of the first section and the second section of the acoustic waveguide may comprise at least one transition region intercalated between a whole acoustic horn and a portion of another subsequent acoustic horn in the series of acoustic horns.

The portion of another subsequent acoustic horn of the first section of the acoustic waveguide may be substantially continuous with the portion of another subsequent acoustic horn of the second section of the acoustic waveguide.

Preferably, the first section of the acoustic waveguide may comprise a transition region intercalated between a whole acoustic horn (housed near the inner end of the acoustic waveguide) and half of another subsequent acoustic horn and the second section of the acoustic waveguide may also comprise a transition region intercalated between a whole acoustic horn (housed near the outer end of the acoustic waveguide) and half of another subsequent acoustic horn. In this preferred arrangement, the half of another subsequent acoustic horn of the first section is substantially continuous with the half of another subsequent acoustic horn of the second section of the acoustic waveguide.

Alternatively, either one or both of the first section and the second section of the acoustic waveguide may comprise at least one transition region intercalated between two whole acoustic horns in the series of acoustic horns.

The whole acoustic horn of the first section of the acoustic waveguide may be substantially continuous with another subsequent whole acoustic horn of the second section of the acoustic waveguide.

The body module may comprise a filter configured to be located at the end of the second section of the acoustic waveguide facing the first section of the acoustic waveguide. The filter prevents small pieces of debris (ear wax, dust, etc) from reaching, and therefore potentially damaging, the acoustic transducer.

The filter may comprise a mesh. The filter may be made of plastic or metal. Preferably, the filter may be a perforated metal.

The filter may have a cross-sectional shape matching the cross-sectional shape of the transition region intercalated between two whole or partial acoustic horns located at the interface between the first and second sections of the acoustic waveguide. Preferably, when the transition region between the first and second sections of the acoustic waveguide has a spherical cross-section, the filter will also have a spherical cross-section.

The filter may be moulded to the end of the second section of the body module. Moulding the filer prevents it from falling off.

In accordance with a second aspect of the invention, there is provided a modular earphone comprising the modular earphone segment of the first aspect of the invention, an acoustic transducer and a back case encasing the acoustic transmission module of the modular earphone segment, wherein the acoustic transducer is housed completely within the acoustic transducer seating of the acoustic transmission module. This configuration is particularly advantageous for transmitting acoustic vibrations to the user's ear since the acoustic transducer seating (typically made of hard plastic) secures the acoustic transducer such that there is maximum acoustic vibrational transfer through the softer rubbers of the body module and acoustic seal module.

In accordance with a third aspect of the invention, there is provided a modular earphone comprising the modular earphone segment of the first aspect of the invention, an acoustic transducer and a back case encasing the acoustic transmission module of the modular earphone segment, wherein the acoustic transducer is housed partially within the acoustic transducer seating of the acoustic transmission module and partially within the back case.

In accordance with a fourth aspect of the invention, there is provided a modular earphone comprising the modular earphone segment of the first aspect of the invention, an acoustic transducer and a back case encasing the acoustic transmission module of the modular earphone segment, wherein the acoustic transducer is housed completely within the back case. This configuration has the advantage of allowing a user to wear over-the-ear 'cans' (or back cases) which have a larger speaker since there is more space outside the ear for a large acoustic transducer.

The back case constitutes the outer aesthetic part of the modular earphone which will be visible when in the users' ear and it may be manufactured in different colours. The back case may have many different design configurations, depending on the target market for the modular earphone (for example, jogging, computer games, airplane use, etc).

The back case may be made from ABS (acrylonitrile butadiene styrene) thermoplastic polymers. Alternatively, the back case may be made from metal or a TPE thermoplastic elastomer.

The modular earphone may further comprise an audio connection to the transmitter of the audio signal (such as music, computer games, etc.) the user would listen to. The audio connection may be releasably attached to the back case of the modular earphone. The audio connection may be detachable from the modular earphone so that it can be replaced with different audio connections as they become available.

The audio connection may be wireless. Alternatively, the audio connection may comprise an electrical connector, such as a wire. Preferably, the electrical connector would go over and behind the user's ear. Alternatively, the electrical connector may simply hang down from the modular earphone. The electrical connector may be a tangle-free electrical cable.

The audio connection may comprise a strain-relief portion for releasing any stress caused on the electrical connector during, for example, bending the electrical connector in the 'over and behind the user's ear' arrangement.

The strain relief portion may also help position the electrical connector when bending around the user's ear.

In accordance with a fifth aspect of the invention, there is provided a pair of modular earphones comprising a left modular earphone and a right modular earphone, each according to any one of aspects two to four of the invention, wherein the shape of the acoustic waveguide of the left modular earphone is a mirror image of the shape of the acoustic waveguide of the right modular earphone.

In accordance with a sixth aspect of the invention, there is provided a method of manufacturing a modular earphone segment according to the first aspect of the invention, the method comprising the steps of providing an acoustic seal module, a body module and an acoustic transmission module, connecting the acoustic transmission module to the body module by means of connecting means, followed by connecting the acoustic seal module to be body module by means of releasably coupling means such that, when connected, the acoustic seal module, the body module and the acoustic transmission module are acoustically coupled.

In accordance with a seventh aspect of the invention, there is provided a method of manufacturing a modular earphone according to any one of aspects two to four of the invention, the method comprising the steps of providing a modular earphone segment according to the first aspect of the invention, providing an acoustic transducer, providing a back case for encasing the acoustic transmission module of the modular earphone segment and connecting the back case to the modular earphone segment such that the acoustic transducer is housed therein.

In accordance with an eight aspect of the invention, there is provided an acoustic transmission module for a modular earphone segment or a modular earphone, the acoustic transmission module comprising an acoustic transducer seating for partially or completely housing an acoustic transducer and acoustic transmission means, wherein the acoustic transmission means comprise means for coupling acoustic waves and/or means for coupling acoustic vibrations from the acoustic transducer to an ear.

The means for coupling acoustic vibrations may comprise forming the acoustic transmission module of a combination of materials having different hardness at different sections of the acoustic transmission module.

The means for coupling acoustic vibrations may comprise any one of or a combination of any one of protruding projections, prongs, lobes, rods and cages.

The means for coupling acoustic vibrations from the acoustic transducer to the ear comprise transmitting the coupled acoustic vibrations into the anti-helix and/or the concha of the ear.

The transmitting of the coupled acoustic vibrations may comprise transmission through the bone, cartilage and nerves of the ear.

BRIEF DESCRIPTION OF THE DRAWINGS

Various aspects of the invention will now be described by way of example only and with reference to the accompanying drawings, of which:

FIG. 4A shows an embodiment of a tip of a prior art acoustic seal module, whereas

DETAILED DESCRIPTION

Figure 1:
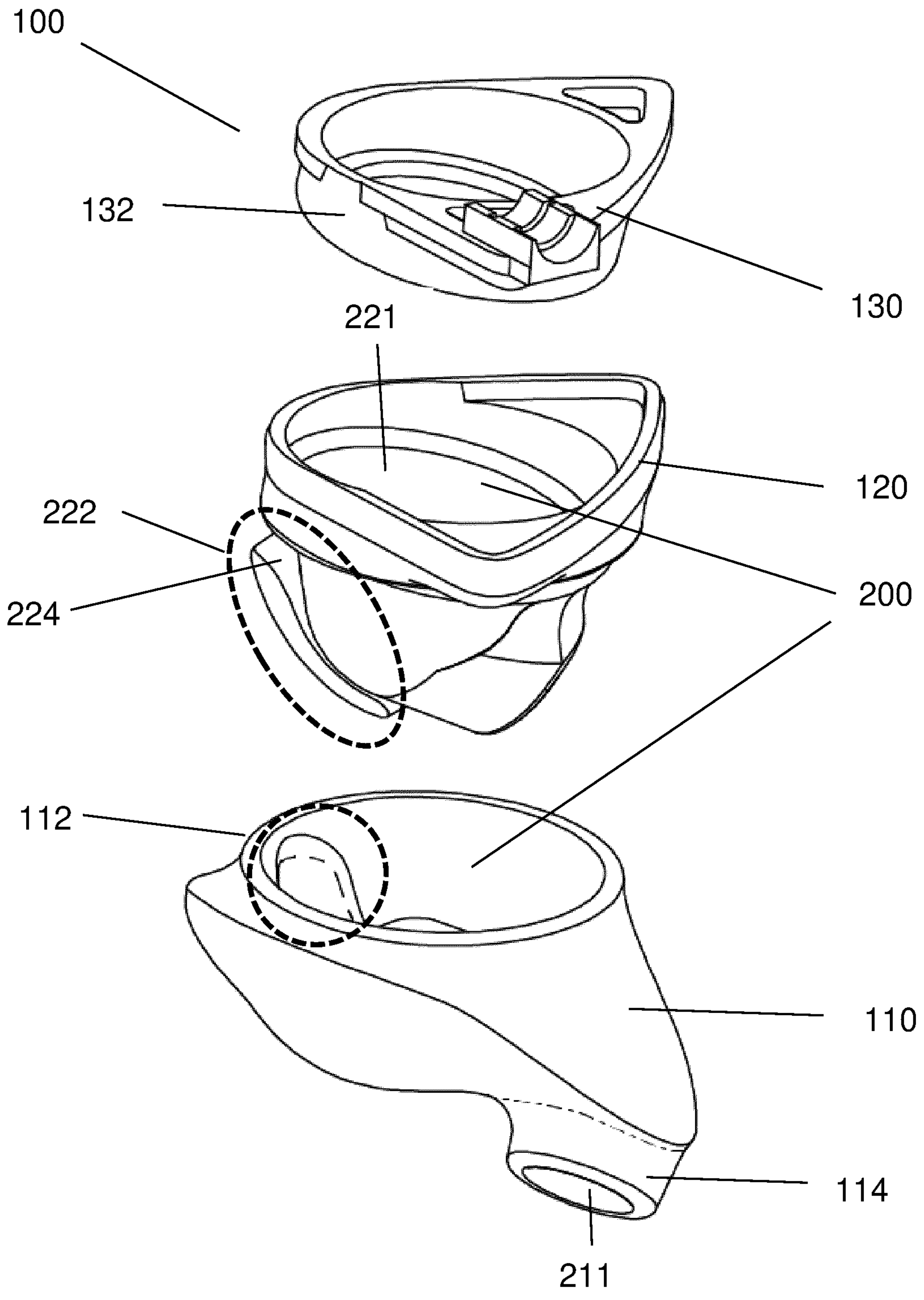
FIG. 1 is an exploded view of the constituent modules (acoustic seal, body and acoustic transmission module) of the modular earphone segment of the first aspect of the invention.

FIG. 1 shows the constituent modules—acoustic seal module (110), body module (120) and acoustic transmission module (130)—of the modular earphone segment (100) of the first aspect of the invention. The modular earphone segment (100) houses an acoustic waveguide (200) therein, the acoustic waveguide (200) having an inner end (211) and an outer end (221), at least the inner end (211) being open.

The acoustic seal module (110) finishes in a tip (114) and houses therein a first section (210) and the inner end (211) of the acoustic waveguide (200).

The body module (120) houses therein a second section (220) and the outer end (221) of the acoustic waveguide (200).

The acoustic seal module (110) is configured to be releasably connected to the body module (120) by the female keying feature (112) cooperating with the male keying features (222, 224). Due to the softer material of the acoustic seal module (110), the female keying feature (112) bends around the male keying feature (222) and attaches (securely and releasably) onto the ledge (224).

In use, since the material of the acoustic seal module (110) is soft, it is therefore flexible enough for the acoustic seal module (110) to be easily unseated and flexed around the male keying feature (222) and the ledge (224) (without permanently deforming the acoustic seal module (110)). This arrangement is advantageous since the ledge (224) gives the acoustic seal module (110) a locating point, thus preventing it from rotating and potentially slipping off.

The body module (120) is configured to be connected to the acoustic transmission module (130) by connecting means (protruding projections 132 in FIG. 2 and prongs 134 in FIG. 3) such that, when connected, the first section (210) of the acoustic waveguide (200) is substantially continuous with the second section (220) of the acoustic waveguide (200) and the acoustic seal module (110), the body module (120) and the acoustic transmission module (130) are acoustically coupled.

Figure 2:
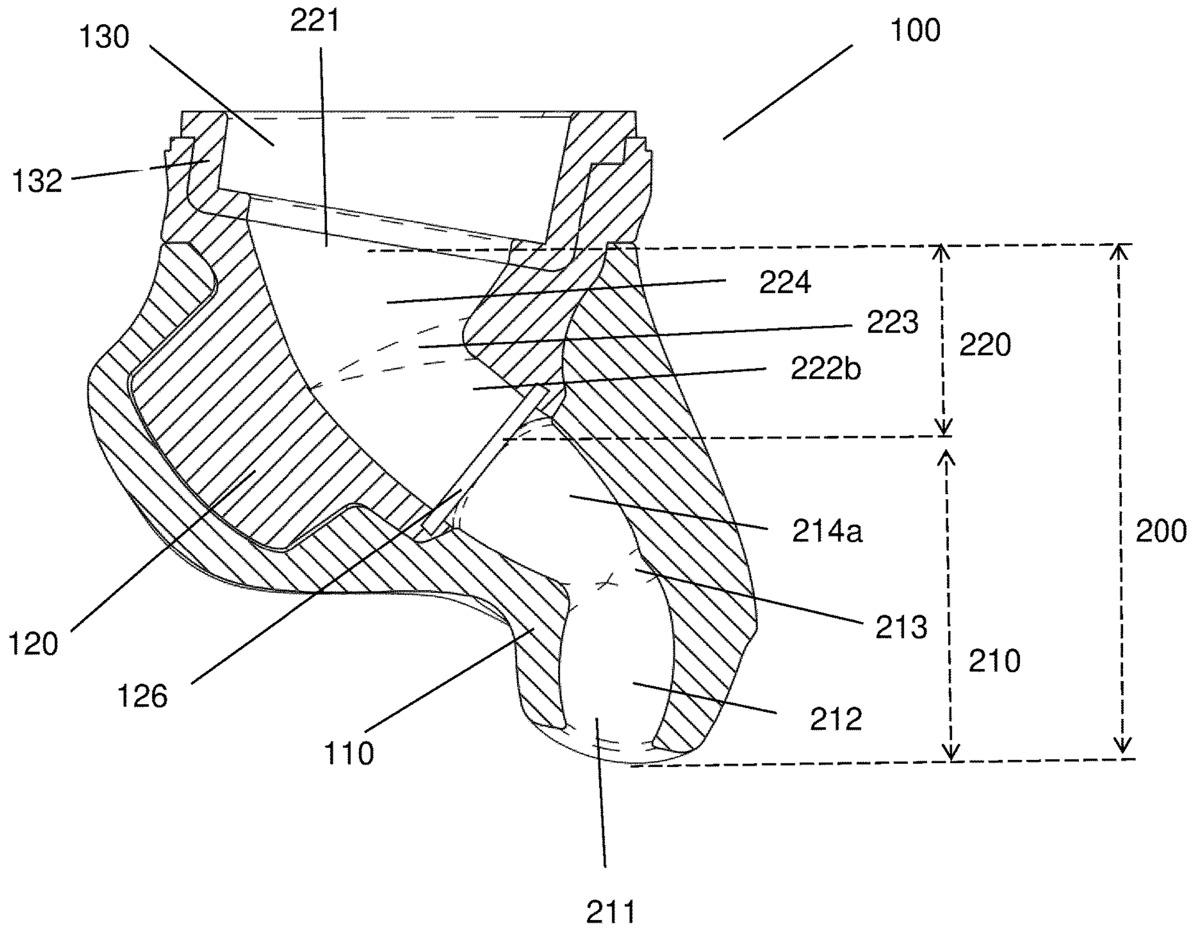
FIG. 2 shows a cross-sectional layout of an embodiment of the modular earphone segment of the first aspect of the invention.

FIG. 2 shows a cross-sectional view of an embodiment of the modular earphone segment of FIG. 1, whereby the body module (120) is connected to the acoustic transmission module (130) by means of the protruding projections (132).

In this embodiment, the acoustic waveguide (200) comprises between the inner end (211) and the outer end (221) a series of three conical acoustic horns (212, 214*a*-222*b*, 224) intercalated between a series of two spherical transition regions (213, 223) such that the first conical acoustic horn (212) of the series of three conical acoustic horns is housed near the inner end (211) of the acoustic waveguide (200) and the last (third) conical acoustic horn (224) of the series of three conical acoustic horns is housed near the outer end (221) of the acoustic waveguide (200).

The first section (210) of the acoustic waveguide (200) represents 50% of the whole acoustic waveguide (200), with the second section (220) representing the other 50% of the whole of the acoustic waveguide (200).

The body module (120) comprises a filter (126) located at the end of the second section (220) of the acoustic waveguide (200) facing the first section (210) of the acoustic waveguide (200). More precisely, the filter (126) is located in the middle of the second conical acoustic horn which, in this embodiment, comprises half of a conical acoustic horn (214*a*) continuously connected to another half (222*b*) of the same (second) conical acoustic horn.

Figure 3:
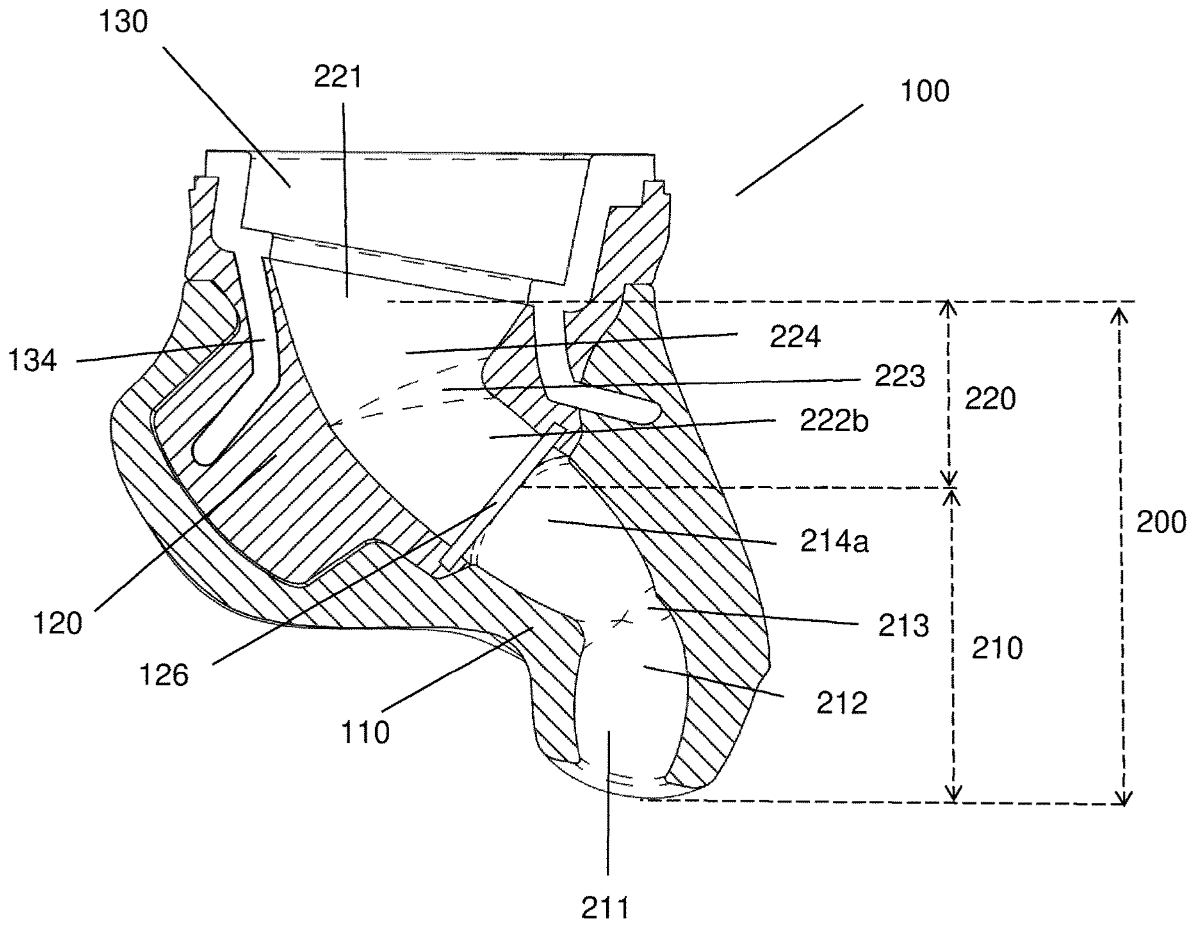
FIG. 3 shows a cross-sectional layout of another embodiment of the modular earphone segment of the first aspect of the invention.

FIG. 3 shows a cross-sectional view of another embodiment of the modular earphone segment of FIG. 1, whereby the body module (120) is connected to the acoustic transmission module (130) by means of the prongs (134). Like parts have been numbered with like numerals as those used in FIG. 2.

Figure 4A:
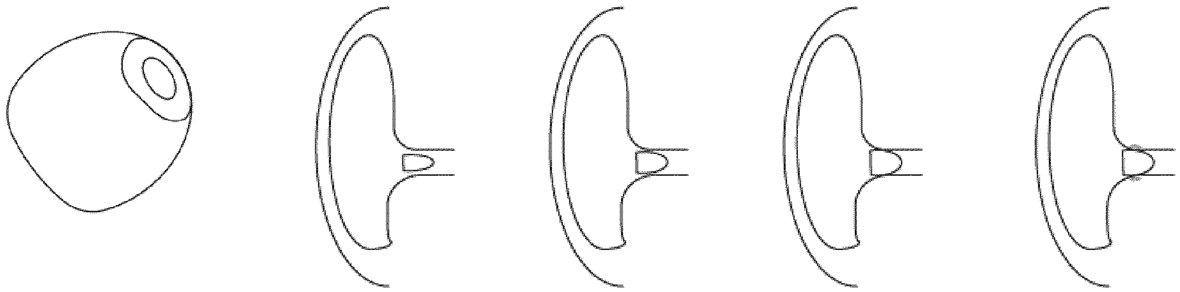
FIGURE 4A (prior art)
Figure 4B:
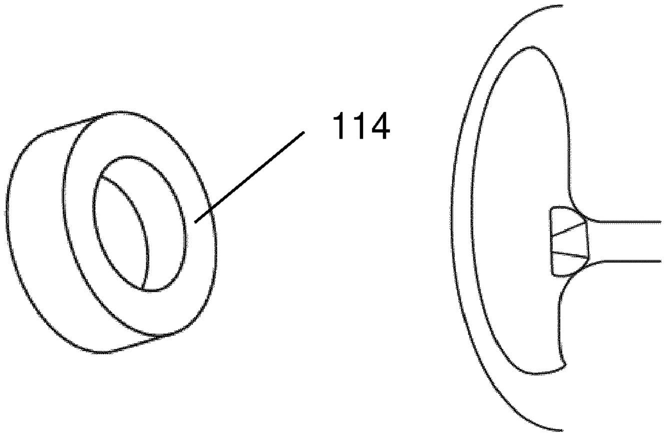
FIGS. 4B and 4C show embodiments of tips of the acoustic seal module of the modular earphone segment of the first aspect of the invention.
Figure 4C:
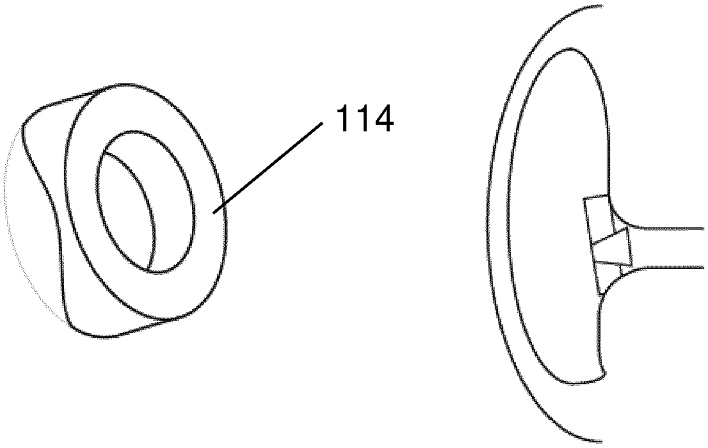

FIG. 4A shows a prior art rounded foam tip which, once inserted directly into the user's ear canal, expands to fill the ear canal space. After time, contact between the expanding foam and the thin skin on the inside of the ear canal causes discomfort, irritation and potentially earache. FIGS. 4B and 4C show embodiments of tips (114) of the acoustic seal module (110). The foam tips (114) do not fully enter the ear canal. The tips rather rest on the crest of the ear canal and, as such, they do not cause discomfort to the user. Having a more cylindrical and flat shape of the tips (114) helps create a bigger surface area for contact on the outside of the ear canal. This in turn creates a gasket/seal which increases isolation dramatically, whilst also reducing the irritation caused by contact between foreign materials and the inside of the ear canal. Whilst FIG. 4B shows a complete tip (114), FIG. 4C shows a tip where a groove has been removed from the cylindrical tip in order to help fit the foam tip (114) better to the geometry of the ear space near the entry into the ear canal.

Figure 5A:
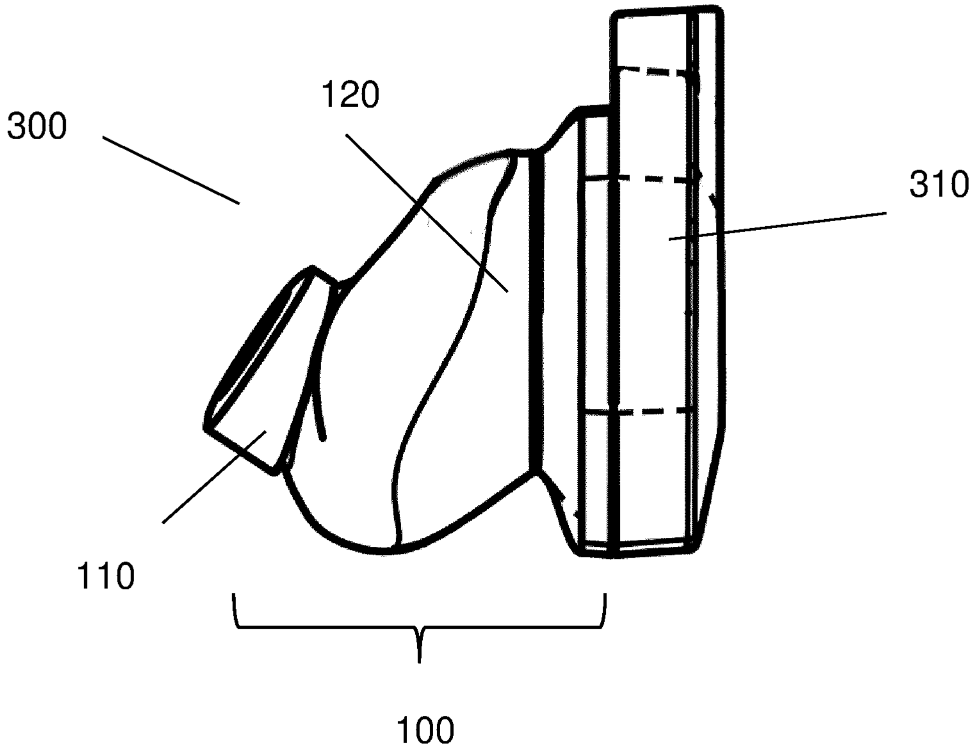
FIGS. 5A and 5B show side and perspective views respectively of a wireless modular earphone of the second aspect of the invention.
Figure 5B:
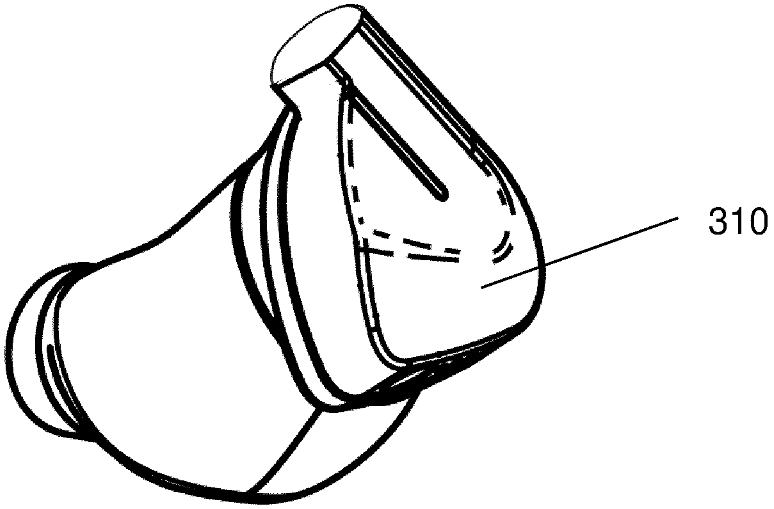

FIGS. 5A and 5B show side and perspective views respectively of a wireless modular earphone (300) of the second aspect of the invention. The modular earphone (300) comprises the modular earphone segment (100) of the first aspect of the invention, an acoustic transducer (500) (not shown) and a back case (310) encasing the acoustic transmission module (130) of the modular earphone segment (100). In this embodiment, the acoustic transducer (500) (shown in FIG. 7) is housed completely within the acoustic transducer seating of the acoustic transmission module (130).

Figure 6A:
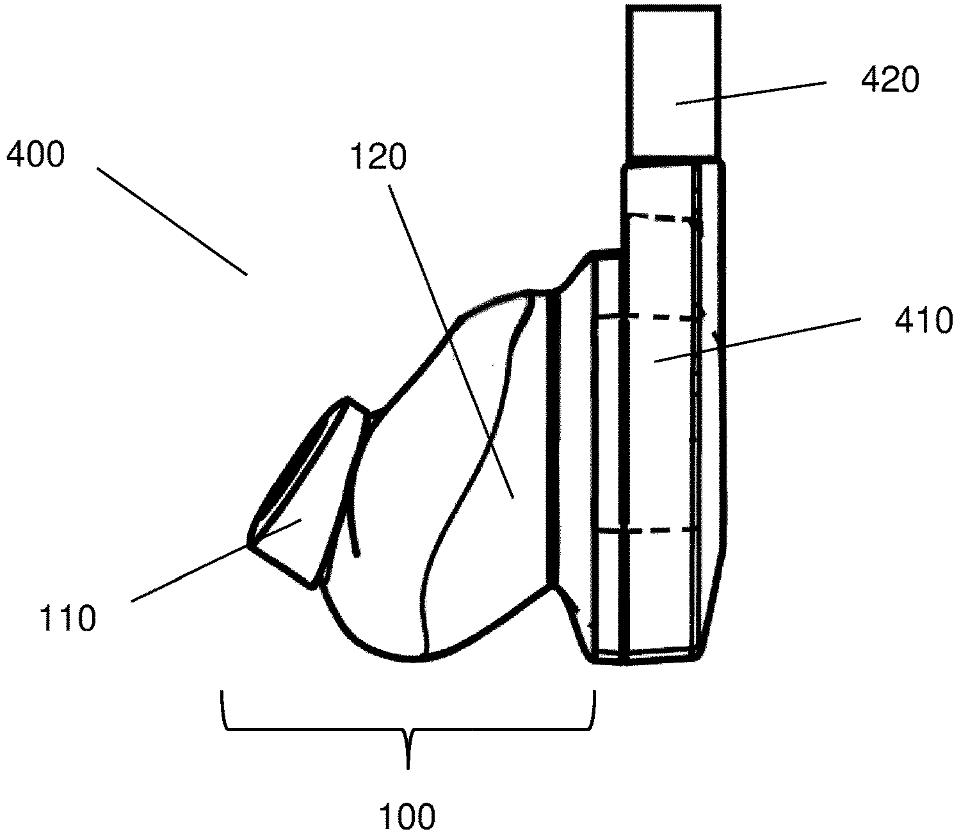
FIGS. 6A and 6B show side and perspective views respectively of a wired modular earphone of the second aspect of the invention.
Figure 6B:
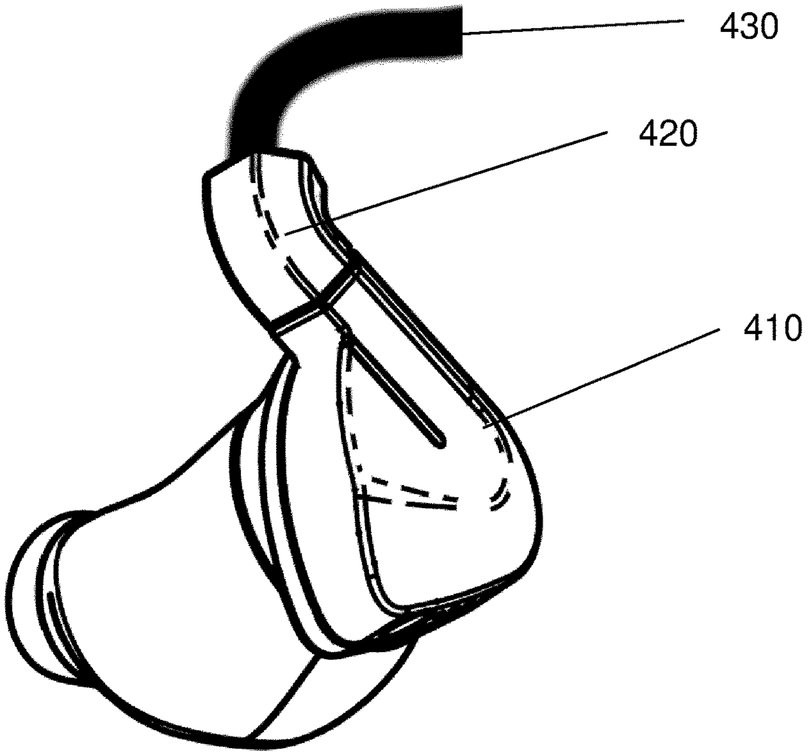

FIGS. 6A and 6B show side and perspective views respectively of a wired modular earphone (400) of the second aspect of the invention. The modular earphone (400) comprises the modular earphone segment (100) of the first aspect of the invention, an acoustic transducer (500) (not shown) and a back case (410) encasing the acoustic transmission module (130) of the modular earphone segment (100). In this embodiment, the acoustic transducer (500) (shown in FIG. 7) is housed completely within the acoustic transducer seating of the acoustic transmission module (130).

The wired modular earphone (400) is provided with the audio connection (420) comprising an electrical connector (430).

Figure 7:
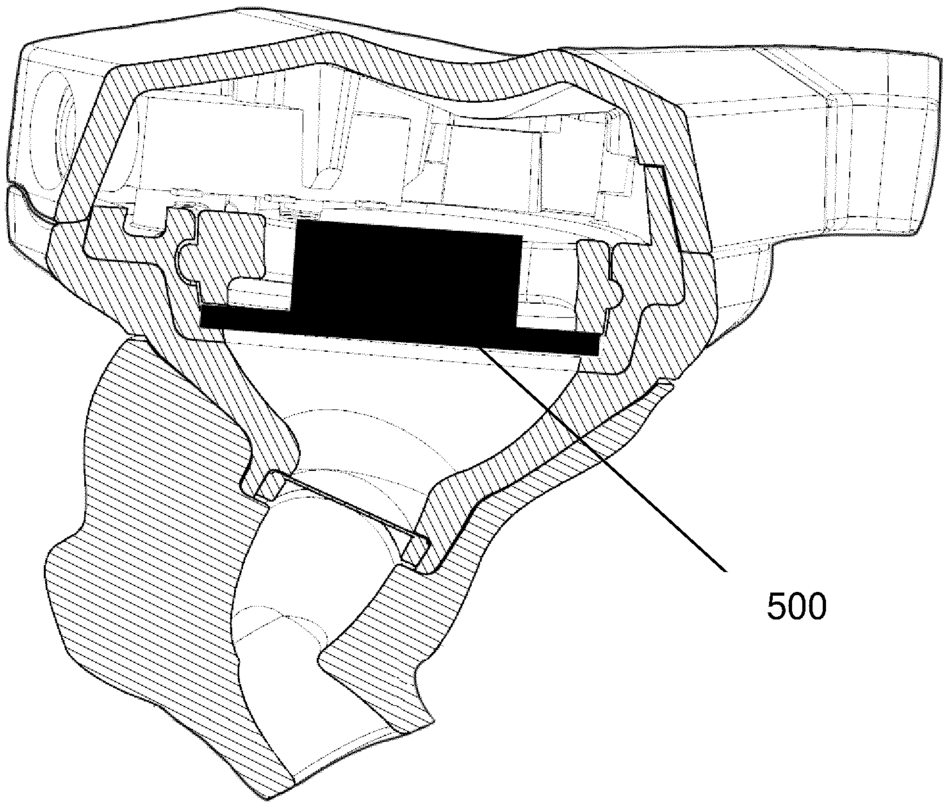
FIG. 7 shows the location of an acoustic transducer in a cross-sectional layout of an embodiment of the modular earphone of the second aspect of the invention.

FIG. 7 shows the location of the acoustic transducer (500) in a cross-sectional layout of the modular earphone (300) of FIGS. 5A and 5B or the modular earphone (400) of FIGS. 6A and 6B of the second aspect of the invention.

Figure 8:
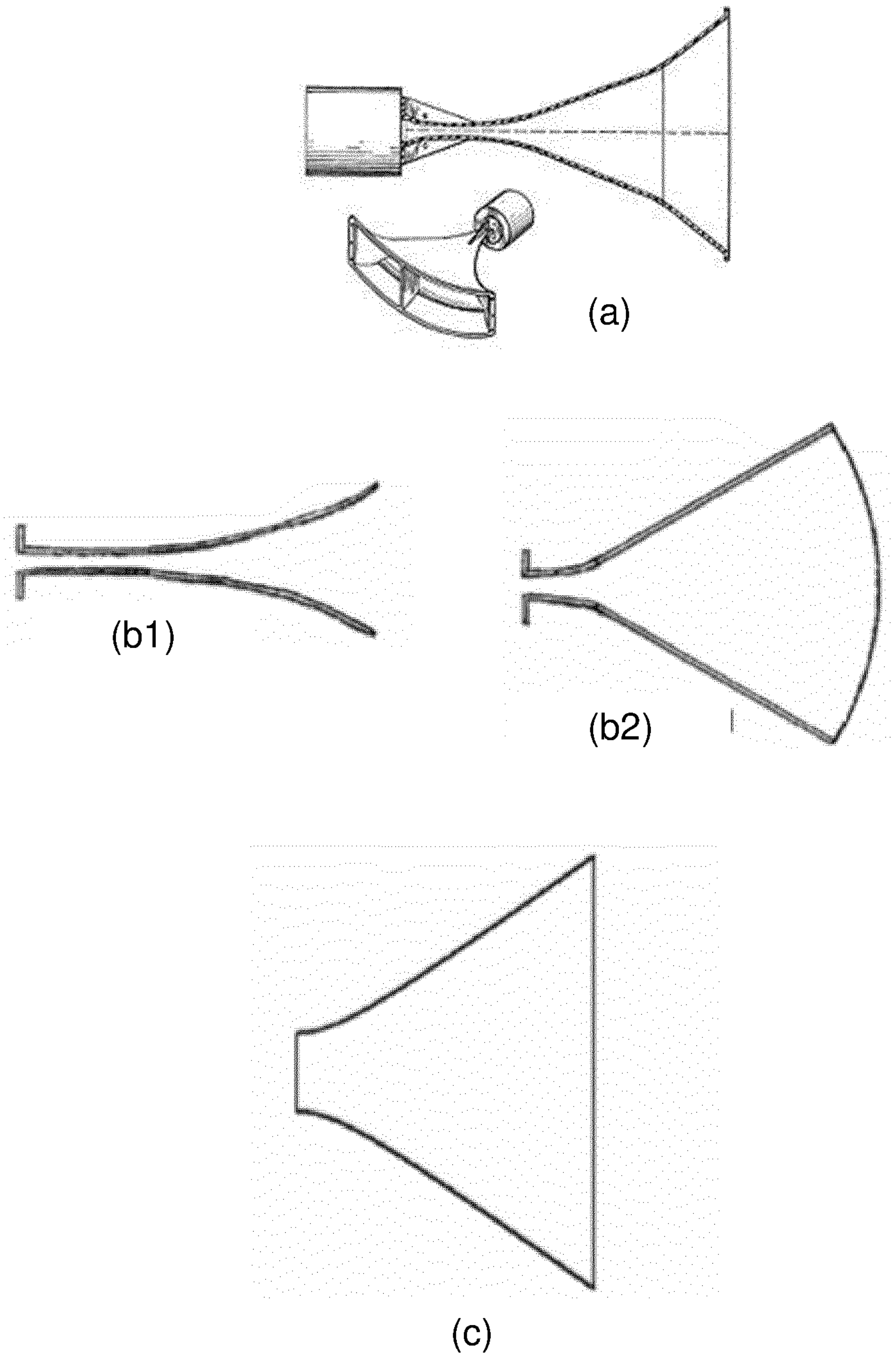
FIG. 8 shows several cross-sectional shapes of acoustic horns.

FIG. 8 shows several cross-sectional shapes of acoustic horns—a radial horn in a vertical (b1) and horizontal (b2) cross-section and an oblate spheroidal horn cross-section (c). FIG. 7(*a*) illustrates how acoustic horns typically flare out from the driver.

Figure 9:
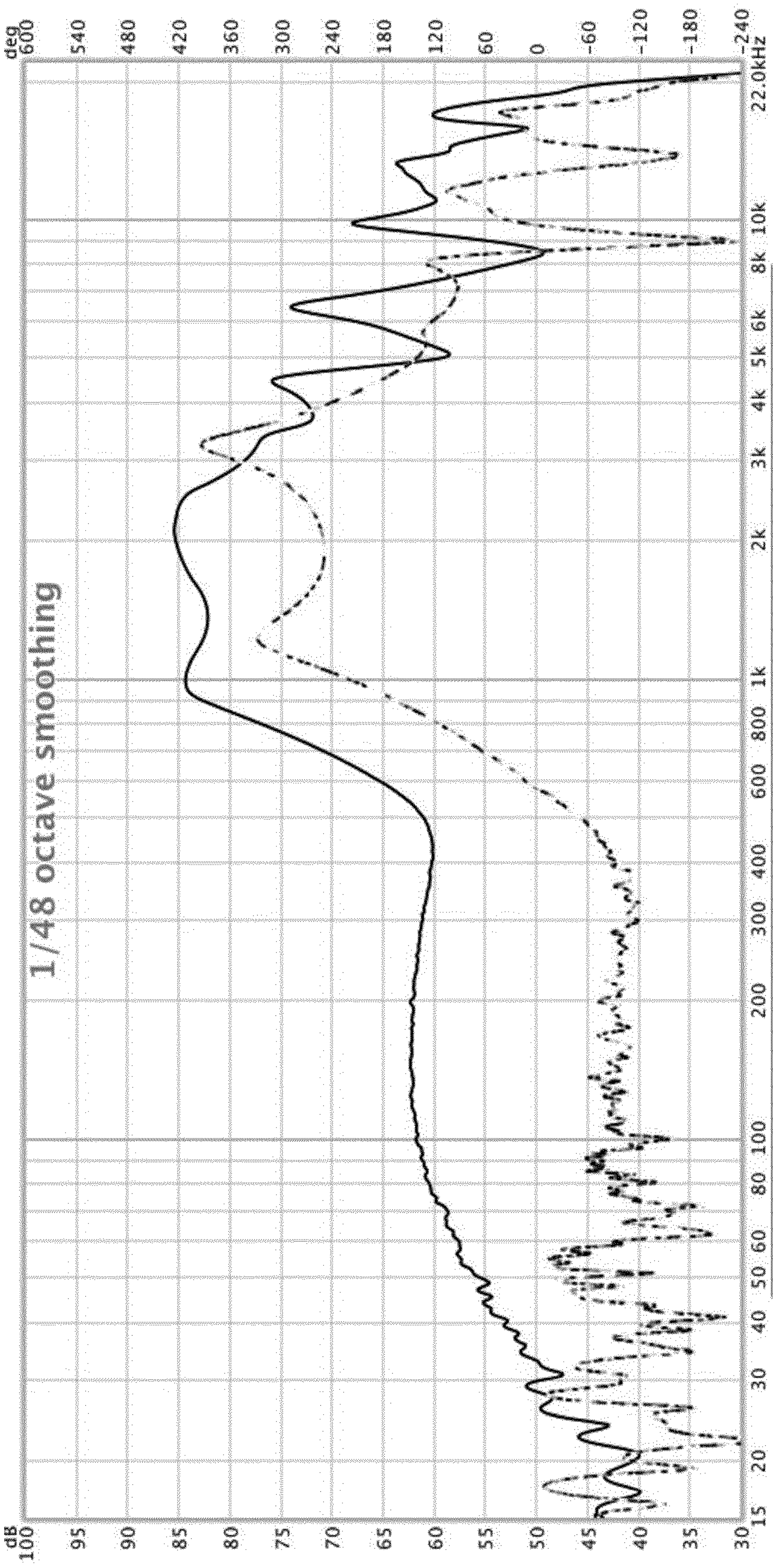
FIG. 9 shows a graph of the frequency response of the modular earphone of the second aspect of the invention.

Using the modular earphone segment (100) of FIG. 2 incorporated into the modular earphone (400) of FIGS. 6A and 6B, FIG. 9 shows a graph of the frequency response.

Frequency response is the measure of an earphone's ability to reproduce all frequencies equally. Theoretically, the graph should be a flat line. The left-hand side of the line is the bass, the right side is the treble. If the line is high on the left and low on the right, the earphones would be considered bass heavy. If the line is low on the left and high on the right, the headphones would likely be "bright" sounding with an emphasis on the highs and lean bass response.

To test the modular earphone, the inventors have driven the earphones with a series tones at the same voltage and increasing frequency. The output is measured at each frequency using a sensitive microphone. The continuous line is the exact same driver when channeled through the acoustic waveguide. It both boosts the output and also flattens the output which are both desirable performance features. The dotted line is the frequency response of the driver when it is not channeled by the waveguide.

Although illustrative embodiments of the invention have been disclosed in detail herein, with reference to the accompanying drawings, it is understood that the invention is not limited to the precise embodiment and that various changes and modifications can be effected therein by one skilled in the art without departing from the scope of the invention as defined by the appended claims and their equivalents. For example, although FIGS. 2 and 3 show cross-sectional layouts of modular earphone segments comprising protruding projections (132) and prongs (134) respectively, other alternative embodiments maybe envisaged comprising lobes, rods or cages.

The invention claimed is:

1. A modular earphone segment housing an acoustic waveguide therein, the acoustic waveguide having an inner end and an outer end, at least the inner end being open, the modular earphone segment comprising:

an acoustic seal module housing therein a first section and the inner end of the acoustic waveguide, a body module housing therein a second section and the outer end of the acoustic waveguide, and an acoustic transmission module, wherein the acoustic seal module is configured to be connected to the body module by releasably coupling means and the body module is configured to be connected to the acoustic transmission module by connecting means such that, when connected, the first section of the acoustic waveguide is substantially continuous with the second section of the acoustic waveguide and the acoustic seal module, the body module and the acoustic transmission module are acoustically coupled, and wherein the acoustic waveguide comprises, between the inner end and the outer end, a series of acoustic horns intercalated between a series of transition regions such that a first acoustic horn of the series of acoustic horns is housed near the inner end of the acoustic waveguide and a last acoustic horn of the series of acoustic horns is housed near the outer end of the acoustic waveguide.

2. The modular earphone segment of claim 1, wherein the acoustic transmission module comprises an acoustic transducer seating for partially or completely housing an acoustic transducer and acoustic transmission means.

3. The modular earphone segment of claim 2, wherein the acoustic transmission means comprise means for coupling acoustic waves and/or means for coupling acoustic vibrations from the acoustic transducer into an ear.

4. The modular earphone segment of claim 3, wherein the means for coupling acoustic waves from the acoustic transducer into the ear comprise coupling by means of the acoustic waveguide.

5. The modular earphone segment of claim 3, wherein the means for coupling acoustic vibrations comprise forming the acoustic transmission module of a combination of materials having different hardness at different sections of the acoustic transmission module.

6. The modular earphone segment of claim 3, wherein the means for coupling acoustic vibrations comprise any one of or a combination of any one of protruding projections, prongs, lobes, rods, and cages.

7. The modular earphone segment of claim 3, wherein the means for coupling acoustic vibrations from the acoustic transducer into the ear comprise transmitting the coupled acoustic vibrations into the anti-helix and/or the concha of the ear and/or the entry into the ear canal.

8. The modular earphone segment of claim 7, wherein the transmitting of the coupled acoustic vibrations comprises transmission through the bone, cartilage, and nerves of the ear.

9. The modular earphone segment of claim 3, wherein the connecting means comprise the means for coupling acoustic vibrations.

10. The modular earphone segment of claim 1, wherein the connecting means connecting the body module to the acoustic transmission module are configured to be attached, 3D printed, moulded, co-moulded, or over-moulded to the acoustic transmission module.

11. The modular earphone segment of claim 10, wherein the acoustic transmission module is configured to be attached, moulded, 3D printed, co-moulded, or over-moulded to the body module by means of the attached, 3D printed, moulded, co-moulded, or over-moulded connecting means.

12. The modular earphone segment of claim 1, wherein some or all of the acoustic horns of the series of acoustic horns have any one of or a combination of any one of conical, spherical wave, spheroidal waveguide, radial, hyperbolic, parabolic, reversed flare, oblate, oblate spheroidal waveguide, exponential, exponential quadratic, pipe, parabolic, multicellular, reversed flare, Le Cleac'h, Manta-Ray, Western Electric, Wilson modified exponential, and Iwata horn shapes.

13. The modular earphone segment of claim 12, wherein some or all of the transition regions of the series of intercalated transition regions are configured to have transition shapes acoustically matched to the shapes of adjoining horns.

14. The modular earphone segment of claim 1, wherein the first acoustic horn is configured to flare out towards the inner end of the acoustic waveguide to sculpt and couple acoustic waves into the canal of an ear.

15. The modular earphone segment of claim 1, wherein the last acoustic horn is configured to flare out towards the outer end of the acoustic waveguide to couple acoustic waves from the acoustic transmission module into the acoustic waveguide.

16. The modular earphone segment of claim 1, wherein the acoustic waveguide includes a series of bends between the inner end and the outer end.

17. The modular earphone segment of claim 16, wherein the series of intercalated transition regions is located at the series of bends.

18. The modular earphone segment of claim 1, wherein either one or both of the first section and the second section of the acoustic waveguide comprise at least one transition region intercalated between a whole acoustic horn and a portion of another subsequent acoustic horn in the series of acoustic horns.

19. The modular earphone segment of claim 18, wherein the portion of another subsequent acoustic horn of the first section of the acoustic waveguide is substantially continuous with the portion of another subsequent acoustic horn of the second section of the acoustic waveguide.

20. The modular earphone segment of claim 1, wherein either one or both of the first section and the second section of the acoustic waveguide comprise at least one transition region intercalated between two whole acoustic horns in the series of acoustic horns.

21. The modular earphone segment of claim 1, wherein the releasably coupling means connecting the body module to the acoustic seal module comprise cooperating coupling means, such as cooperating pairs of male keying features and female keying features.

22. The modular earphone segment of claim 1, wherein the acoustic seal module comprises an ear tip located at the inner end of the acoustic seal module.

23. The modular earphone segment of claim 22, wherein the ear tip is formed of an elastomeric material, wherein the elastomeric material comprises a memory foam.

24. A modular earphone comprising:

the modular earphone segment of claim 1;

an acoustic transducer; and a back case encasing the acoustic transmission module of the modular earphone segment, wherein the acoustic transducer is housed completely within the acoustic transducer seating of the acoustic transmission module.

25. A pair of modular earphones comprising a left modular earphone and a right modular earphone, each according to claim 24, wherein the shape of the acoustic waveguide of the left modular earphone is a mirror image of the shape of the acoustic waveguide of the right modular earphone.

26. A method of manufacturing the modular earphone segment according to claim 1, the method comprising:

providing the acoustic seal module, the body module, and the acoustic transmission module, connecting the acoustic transmission module to the body module by means of the connecting means, followed by connecting the acoustic seal module to be body module by means of releasably coupling means, such that, when connected, the acoustic seal module, the body module, and the acoustic transmission module are acoustically coupled.

27. A method of manufacturing the modular earphone according to claim 24, the method comprising:

providing the modular earphone segment according to claim 1, providing the acoustic transducer, providing the back case for encasing the acoustic transmission module of the modular earphone segment, and connecting the back case to the modular earphone segment such that the acoustic transducer is housed therein.

28. A modular earphone comprising:

the modular earphone segment of claim 1;

an acoustic transducer; and a back case encasing the acoustic transmission module of the modular earphone segment, wherein the acoustic transducer is housed partially within the acoustic transducer seating of the acoustic transmission module and partially within the back case.

29. A modular earphone comprising:

the modular earphone segment of claim 1;

an acoustic transducer; and a back case encasing the acoustic transmission module of the modular earphone segment, wherein the acoustic transducer is housed completely within the back case.

* * * * *